No. 820,899. PATENTED MAY 15, 1906.
W. E. WILLIAMS.
SHREDDED WHEAT BISCUIT.
APPLICATION FILED OCT. 4, 1904.

Witnesses
J. H. Angell.
D. M. Brown.

Inventor
William E. Williams,
by Wallace Greene,
Atty.

UNITED STATES PATENT OFFICE.

WILLIAM ERASTUS WILLIAMS, OF CHICAGO, ILLINOIS.

SHREDDED-WHEAT BISCUIT.

No. 820,899.     Specification of Letters Patent.     Patented May 15, 1906.

Application filed October 4, 1904. Serial No. 227,147.

*To all whom it may concern:*

Be it known that I, WILLIAM ERASTUS WILLIAMS, a citizen of the United States of America, and a resident of Chicago, county of Cook, and State of Illinois, have invented certain new and useful Improvements in Shredded-Wheat Biscuits, of which the following is a specification.

The object of my invention is to provide a biscuit of pleasing appearance that shall have many advantages over biscuits heretofore in use. With this end in view, suitable food materials are converted into filamentary form and then made into cup-shaped biscuits.

Figure 1:
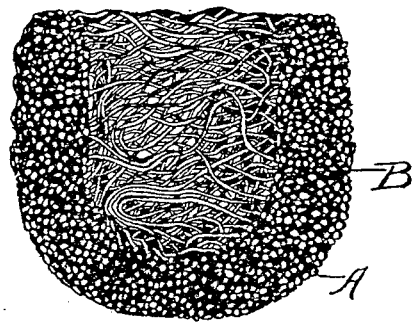
Figure 2:
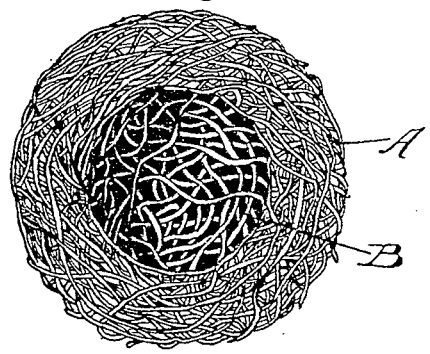
Figure 3:
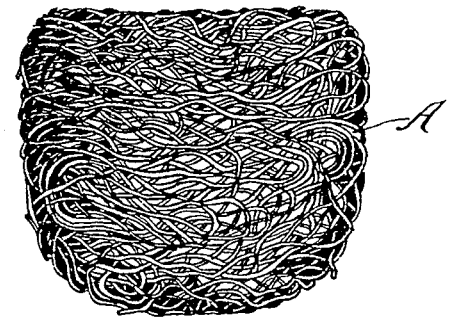

In the accompanying drawings, Figure 1 is an axial section of such a cup-shaped biscuit. Fig. 2 is a top plan view of the same biscuit. Fig. 3 shows the biscuit in side view.

Any suitable material may be used, but cereals, and preferably whole wheat, corn, barley, rye, or oats, or some blending of them, is employed.

Whatever the material the filaments are assembled in the form of a cup A, preferably having all its walls of approximately the same thickness, which may be varied as desired, and, as appears from the drawings, the filaments are so arranged that although they interlace by passing toward and away from the interior of the cup the general course of nearly all of them is around the cup in various directions, the result being that the structure has a peculiar nest-like appearance while an axial section shows principally filament ends.

The biscuit described may be formed in any suitable manner, for example, by gently forcing into a suitable cavity or mold the desired quantity of more or less interlaced fibers having for the most part the same general direction, the fibers being given a somewhat annular direction, either beforehand or while they are passing into the cup. In the latter case the cup may be rotated or the fibers themselves may be carried in the desired direction.

The size and form of the cup are such that it approximately fits the dishes in which such foods are ordinarily served, and obviously cream and sugar or the like may be placed in the cavity B, whence the sponge-like biscuit absorbs them.

This biscuit entirely eliminates the evils incident to pouring cream upon the convex surface of biscuit whose ends or some filaments of them often project beyond the margin of the containing dish. It has advantages also in that its comparatively thin shell is readily broken down with a spoon or fork and in that meats, fruits, eggs, jellies, and many other articles of food may be very conveniently served in the cup and thus a great variety of appetizing and healthful dishes may be quickly formed with this biscuit as a basis.

The biscuit being merely a thin shell in comparison with the ordinary biscuit, it is quickly and evenly baked and its exposed surface is relatively so large that nearly all the filaments of the whole mass of the biscuit is made brown and brittle, either originally or when slight dampness has lessened the very desirable crispness.

The biscuit being of such a light filamentary character has the quality of tenderness or crispness without the use of any leavening or shortening material and because it contains no such foreign material it readily takes on the flavor of even delicately-flavored foods placed within it.

What I claim is—

1. A cup-shaped biscuit made up of interlaced cereal filaments whose general courses are around the cup in various directions, forming a nest-like structure.

2. A cup-shaped biscuit having its walls made up of interlaced cereal filaments forming a nest-like structure with a rounded edge the general course of which is approximately followed by the filaments visable at that edge.

Signed at Chicago the 28th day of September, 1904.

WILLIAM ERASTUS WILLIAMS.

Witnesses:
ROBT. C. BORN,
CECIL BRONSON.